US010303752B2

United States Patent
Samuel

(10) Patent No.: US 10,303,752 B2
(45) Date of Patent: *May 28, 2019

(54) TRANSFERRING A WEB CONTENT DISPLAY FROM ONE CONTAINER TO ANOTHER CONTAINER WHILE MAINTAINING STATE

(71) Applicant: GOOGLE LLC, Mountain View, CA (US)

(72) Inventor: Fady Samuel, Kitchener (CA)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/909,920

(22) Filed: Mar. 1, 2018

(65) Prior Publication Data

US 2018/0196791 A1     Jul. 12, 2018

Related U.S. Application Data

(63) Continuation of application No. 14/690,273, filed on Apr. 17, 2015, now Pat. No. 9,940,312.

(60) Provisional application No. 62/081,481, filed on Nov. 18, 2014.

(51) Int. Cl.
　　*G06F 17/00*　　(2019.01)
　　*G06F 17/22*　　(2006.01)
　　*H04L 29/08*　　(2006.01)

(52) U.S. Cl.
　　CPC ........ *G06F 17/2264* (2013.01); *G06F 17/227* (2013.01); *G06F 17/2247* (2013.01); *H04L 67/02* (2013.01); *H04L 67/06* (2013.01); *H04L 67/10* (2013.01)

(58) Field of Classification Search
　　CPC . G06F 17/2264; G06F 17/2247; G06F 17/227
　　USPC .................................................. 715/205, 234
　　See application file for complete search history.

(56) References Cited

U.S. PATENT DOCUMENTS

| 5,157,763 A | 10/1992 | Peters et al. |
| 5,226,117 A | 7/1993 | Miklos |
| 5,606,674 A | 2/1997 | Root |
| 5,956,483 A | 9/1999 | Grate et al. |

(Continued)

OTHER PUBLICATIONS

Morris et al., WeSearch: Supporting Collaborative Search and Sensemaking on a Tabletop Display, ACM 2010, pp. 401-410. (Year: 2010).*

(Continued)

*Primary Examiner* — Cong-Lac Huynh
(74) *Attorney, Agent, or Firm* — Morgan, Lewis & Bockius LLP

(57) ABSTRACT

Systems and methods for transferring a web content display from one container to another container are disclosed. A request to transfer a first web content display hosted in a first container having a first document object model (DOM) tree to a second container having a second DOM tree is received. The first web content display has a state comprising a plurality of state components. A second web content display hosted in the second container is created. If a first state component is dependent on a property of the first DOM tree associated with a host of the first web content display: the first state component is adjusted in the second web content display according to a corresponding property of the second DOM tree.

20 Claims, 5 Drawing Sheets

(56) References Cited

U.S. PATENT DOCUMENTS

| | | | |
|---|---|---|---|
| 6,437,807 B1 | 8/2002 | Berquist et al. | |
| 6,856,415 B1 | 2/2005 | Simchik et al. | |
| 6,950,964 B1 | 9/2005 | McMichael et al. | |
| 7,539,945 B2 | 5/2009 | Conrad et al. | |
| 7,577,905 B2 | 8/2009 | Collins et al. | |
| 8,103,743 B2* | 1/2012 | Tokumi | G06Q 30/02 709/218 |
| 8,136,047 B2 | 3/2012 | Holecek et al. | |
| 8,200,962 B1 | 6/2012 | Boodman et al. | |
| 8,209,377 B2 | 6/2012 | Minamida | |
| 8,676,973 B2 | 3/2014 | Isaacson | |
| 8,769,551 B2 | 7/2014 | Lapuyade | |
| 9,122,547 B1 | 9/2015 | Samuel | |
| 9,307,003 B1 | 4/2016 | Sebastian et al. | |
| 9,679,144 B2 | 6/2017 | Molnar et al. | |
| 2002/0145042 A1 | 10/2002 | Knowles et al. | |
| 2003/0051031 A1 | 3/2003 | Streble | |
| 2004/0078424 A1 | 4/2004 | Yairi et al. | |
| 2006/0224967 A1 | 10/2006 | Marmaros | |
| 2007/0011713 A1 | 1/2007 | Abramson et al. | |
| 2007/0266342 A1 | 11/2007 | Chang et al. | |
| 2008/0137819 A1 | 6/2008 | Temov | |
| 2008/0163081 A1 | 7/2008 | Gillette et al. | |
| 2009/0134751 A1 | 5/2009 | Ingjaldsdottir et al. | |
| 2009/0234751 A1 | 9/2009 | Chan et al. | |
| 2010/0114788 A1 | 5/2010 | White et al. | |
| 2010/0211596 A1 | 8/2010 | Tang | |
| 2010/0217838 A1 | 8/2010 | Wormald | |
| 2010/0306644 A1* | 12/2010 | Underwood | G06Q 10/10 715/234 |
| 2011/0119637 A1 | 5/2011 | Tuli et al. | |
| 2011/0202971 A1 | 8/2011 | Margolin | |
| 2011/0239125 A1 | 9/2011 | Kristensen et al. | |
| 2012/0284694 A1 | 11/2012 | Waugh et al. | |
| 2012/0290935 A1 | 11/2012 | Ihara et al. | |
| 2012/0297399 A1 | 11/2012 | Beaver et al. | |
| 2013/0054672 A1 | 2/2013 | Stilling et al. | |
| 2013/0311871 A1 | 11/2013 | Turner et al. | |
| 2015/0095838 A1* | 4/2015 | Rossi | G06F 3/0483 715/777 |
| 2015/0334138 A1 | 11/2015 | Conklin et al. | |
| 2016/0084781 A1 | 3/2016 | Lee et al. | |
| 2016/0124595 A1 | 5/2016 | Kim et al. | |
| 2016/0140095 A1 | 5/2016 | Park et al. | |
| 2016/0275127 A1 | 9/2016 | Freishtat et al. | |
| 2017/0052655 A1 | 2/2017 | Cervelli et al. | |
| 2018/0268637 A1* | 9/2018 | Kurian | G07D 11/0009 |

OTHER PUBLICATIONS

Sanchez et al., Touch & Share: RFID Based Ubiquitous File Containers, ACM 2008, pp. 57-63. (Year: 2008).*

Mickens et al., Atlantis: Robust, Extensible Execution Environments for Web Applications, ACM 2011, pp. 217-231. (Year: 2011).*

Ding et al., "Centralized Content-Based Web Filtering and Blocking: How Far Can it Go?" IEEE 1999, pp. 115-119.

Ramaswamy et al., "Automatic Detection of Fragments in Dynamically Generated Web Pages," ACM 2004, pp. 443-454.

Wilton et al., "Beginning JavaScript, Fourth Edition (Chapter 13: 'Using ActiveX and Plug-Ins with JavaScript')," Oct. 2009, Wiley Publishing, pp. 469-489.

Zhang et al., "Security and Trust in Digital Rights Management: A Survey," International Journal of Network Security, Nov. 2009, vol. 9, No. 3, pp. 247-263.

* cited by examiner

```
function swap() {
    var windows = BROWSER.app.windows.getAll();
    var a = windows[0].contentWindow.document.querySelector('webview');
    var b = windows[1].contentWindow.document.querySelector('webview');
    var ga = a.detach();
    var gb = b.detach();
    b.attach(ga);
    a.attach(gb);
}
```

FIG. 5

TRANSFERRING A WEB CONTENT DISPLAY FROM ONE CONTAINER TO ANOTHER CONTAINER WHILE MAINTAINING STATE

CROSS REFERENCE TO RELATED APPLICATIONS

The present application is a continuation application of U.S. patent application Ser. No. 14/690,273 entitled "TRANSFERRING A WEB CONTENT DISPLAY FROM ONE CONTAINER TO ANOTHER CONTAINER WHILE MAINTAINING STATE," filed on Apr. 17, 2015, now issued as U.S. Pat. No. 9,940,312, which claims priority under 35 U.S. C. § 119(e) and the benefit of U.S. Provisional Application No. 62/081,481, filed Nov. 18, 2014, and entitled, "TRANSFERRING A WEBVIEW FROM ONE CONTAINER TO ANOTHER CONTAINER WHILE MAINTAINING STATE," both of which are incorporated by reference in their entirety for all purposes.

This application is related to U.S. patent application Ser. No. 14/292,757, filed May 30, 2014, entitled, "EMBEDDING A GUEST MODULE WITHIN AN EMBEDDER MODULE," now issued as U.S. Pat. No. 9,122,547, to U.S. patent application Ser. No. 14/807,854, filed Jul. 23, 2015, entitled, "EMBEDDING A GUEST MODULE WITHIN AN EMBEDDER MODULE," now issued as U.S. Pat. No. 9,563,489, and to U.S. patent application Ser. No. 14/292,755, filed May 30, 2014, and entitled, "EMBEDDING A USER INTERFACE OF A GUEST MODULE WITHIN A USER INTERFACE OF AN EMBEDDER MODULE," now issued as U.S. Pat. No. 9,826,008, the entire disclosures of which are incorporated herein by reference.

BACKGROUND

The subject technology is generally directed to transferring a web content display from one container to another container while maintaining state. A web content display includes displayed information associated with an application, such as a web browser, a document processing application, a social networking application, etc. The information displayed in the web content display may be downloaded over a network. For example, in a web browser context, a web content display may include displayed information within a tab of a window. A container includes a collection of one or more web content displays sharing a document object model (DOM) tree. For example, in a web browser context, a container may correspond to a window having one or multiple tabs.

A user of a computer may have multiple open containers. Each container may have multiple open web content displays. The user may wish to transfer a web content display from a first container having a first document object model (DOM) to a second container having a second DOM, for example, in a web browser setting, to consolidate multiple tabs (corresponding to web content displays) into a single window (corresponding to a container) or to logically arrange tabs associated with different tasks (e.g., email/calendar, trip planning, and research) into different windows. For instance, a user may wish to have his/her email and calendar-related tabs in a first window and his/her social networking-related tabs in a second window to avoid commingling email/calendar data and social networking data. However, maintaining the state of the transferred web content display while changing the DOM associated with the web content display may be technically challenging.

SUMMARY

According to some aspects, the subject technology relates to a method. The method includes receiving, at one or more processors, a request to transfer a first web content display hosted in a first container having a first document object model (DOM) tree to a second container having a second DOM tree, wherein the first web content display has a state comprising a plurality of state components. The method includes creating, in response to the request, a second web content display hosted in the second container. The method includes determining whether a first state component in the plurality of state components of the first web content display is dependent on a property of a DOM tree associated with a host of the first web content display. The method includes, upon determining that the first state component is dependent on the property of the DOM tree associated with the host of the first web content display: adjusting, in the second web content display, the first state component according to the property of the second DOM tree. The method includes, upon determining that the first state component is independent of the property of the DOM tree associated with the host of the first web content display: copying, to the second web content display, the first state component of the first web content display. The method includes providing an output associated with the second web content display.

According to some aspects, the subject technology relates to a non-transitory computer-readable medium storing instructions. The instructions include code for receiving a request to transfer a first web content display hosted in a first container having a DOM tree to a second container having a second DOM tree, wherein the first web content display has a state comprising a plurality of state components. The instructions include code for creating, in response to the request, a second web content display hosted in the second container. The instructions include code for determining whether a first state component in the plurality of state components of the first web content display is dependent on a property of a DOM tree associated with a host of the first web content display. The instructions include code for, upon determining that the first state component is dependent on the property of the DOM tree associated with the host of the first web content display: adjusting, in the second web content display, the first state component according to the property of the second DOM tree. The instructions include code for, upon determining that the first state component is independent of the property of the DOM tree associated with the host of the first web content display: copying, to the second web content display, the first state component of the first web content display. The instructions include code for destroying, in response to the request, the first web content display.

According to some aspects, the subject technology relates to a system. The system includes one or more processors and a memory storing instructions. The instructions include code for receiving, at the one or more processors, a request to transfer a first web content display hosted in a first container to a second container, wherein the first web content display has a state comprising a plurality of state components. The instructions include code for creating, in response to the request, a second web content display hosted in the second container. The instructions include code for determining whether a first state component in the plurality of state components of the first web content display is dependent on a property of a container hosting the first web content display. The instructions include code for, upon determining that the first state component is dependent on the property of the container hosting the first web content display: adjusting, in the second web content display, the first state component according to the property of the second container. The instructions include code for, upon determining that the first state component is independent of the property of the container hosting the first web content display: copying, to the second web content display, the first state component of the first web content display.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several aspects of the disclosed subject matter are set forth in the following figures.

FIG. 5 illustrates example code for a swap function according to some implementations.

DETAILED DESCRIPTION

Figure 1:
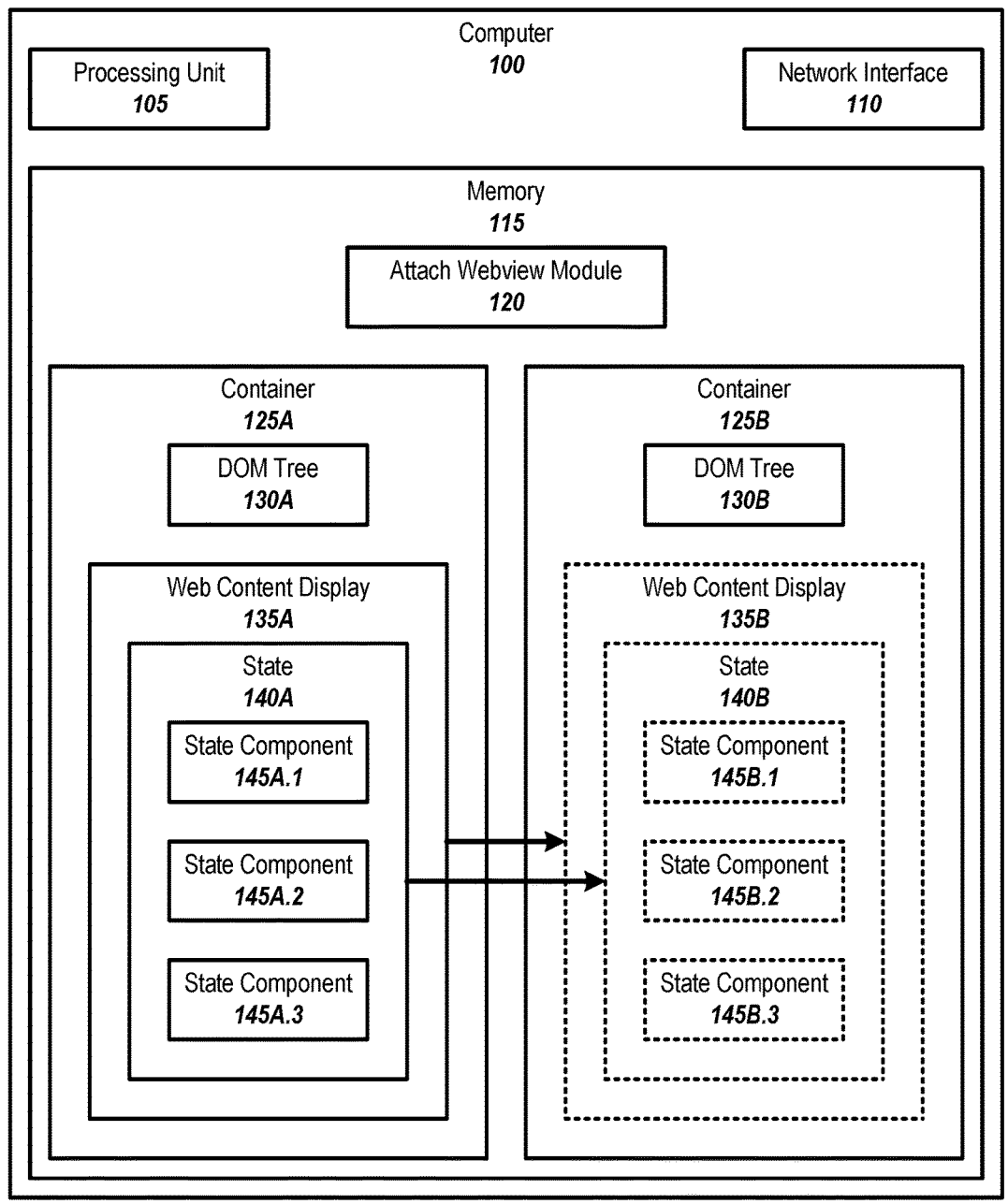
FIG. 1 illustrates an example computer for transferring a web content display from one container to another container.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent that the subject technology is not limited to the specific details set forth herein and may be practiced without these specific details. In some instances, certain structures and components are shown in block diagram form in order to avoid obscuring the concepts of the subject technology.

The subject technology provides, among other things, techniques (e.g., an application programming interface (API)) for transferring a web content display from one container to another container while maintaining state. A web content display includes displayed information associated with an application, such as a web browser, a document processing application, a social networking application, etc. The information displayed in the web content display may be downloaded over a network. For example, in a web browser context, a web content display may include information displayed within a page or web application viewing area of a tab. A container includes a collection of one or more web content displays sharing a document object model (DOM) tree. For example, in a web browser context, a container may correspond to a window having one or multiple tabs. A container may include a <webview> element in JavaScript. According to some examples of the subject technology, a web content display may be transferred from one container to another container.

A user may wish to transfer a web content display from one container to another container for various reasons. For example, in a web browser setting, to consolidate multiple tabs (corresponding to web content displays) into a single window (corresponding to a container) or to logically arrange tabs associated with different tasks (e.g., email/calendar, trip planning, and research) into different windows. For instance, a user may wish to have his/her email and calendar-related tabs in a first window and his/her social networking-related tabs in a second window to avoid commingling email/calendar data and social networking data.

According to some implementations, a first web content display is hosted in a first container of a computer. The first container may thus be referred to as the "host" of the first web content display. The first container has a first DOM tree. A DOM tree may be a tree structure for organizing nodes (e.g., objects or data points) within the container. The first container has a state represented by multiple state components. The multiple state components may include size, event listeners, frame(s), layout, rendering information, etc. The computer receives, from a user or from a remote machine, a request to transfer the first web content display from the first container to a second container having a second DOM tree. In response to the request, the computer creates a second web content display hosted in the second container. The second container may thus be referred to as the "host" of the second web content display.

For each state component in the multiple state components of the first web content display, the computer determines whether the state component is dependent on a property of the first DOM tree associated with the host of the first web content display (i.e., the first container, or another container when/if the first web content display is moved to the other container). Upon determining that a state component is dependent on the property of the first DOM tree, the computer adjusts, in the second web content display, the corresponding state component according to a property of the second DOM tree corresponding to the property of the first DOM tree. For example, if the property of the first DOM tree is "transparency," the computer adjusts, in the second web content display, the corresponding state component according to a transparency value of the second DOM tree, which may be different from a transparency value of the first DOM tree. In some examples, the computer copies the transparency value for the second DOM tree into the second web content display. Upon determining that a state component is independent of the property of the DOM tree, the computer copies, from the first web content display to the second web content display, the first state component of the first web content display. After completing this process for each state component, the computer destroys the first web content display in the first container. The computer informs the user or the remote machine that the second web content display in the second container has been created.

Advantageously, as a result of some implementations of the subject technology, a web content display may exist independently of a container in which the web content display was created, as the web content display may be transferred to a different container. The lifetime of the web content display is thus independent of the lifetime of the hosting container. In some implementations, a value indicating the lifetime (e.g., a variable) may be associated with the web content display instead of being associated with the container.

In one implementation example, a secondary web browser is implemented as a browser application within a primary web browser. This may be useful, for example, if the secondary web browser is better able to display pages in certain formats or pages in certain foreign languages than the primary web browser. A browser application may be any application that uses and runs in a platform of the primary web browser but may, in some cases, launch and run independently of the primary web browser. Alternatively, the browser application may run within the primary web browser (i.e., run in a tab of the primary web browser and require the primary web browser to be open in order to launch and run). In this implementation example, the first container and the second container may include a first window of the secondary web browser and a second window of the secondary web browser, respectively. The first web content display may include information (e.g., a webpage, text, image(s), video(s), etc.) displayed within a tab of the first window of the secondary web browser. The primary web browser may expose an API, as described herein, to allow the secondary web browser to transfer the first web content display from the first container to the second container while maintaining state.

For instance, in the browser context, a user may be working on planning a vacation and doing research for a school paper about the Civil War in multiple tabs of a single browser window. The user may wish to separate the vacation-related tabs and the Civil War-related tabs into multiple windows, so not to commingle the Civil War-related data and the vacation-related data. This may be useful, for example, if a collaborator on the Civil War project joins the user, and the user wants to show the collaborator the Civil War-related tabs without bringing attention to his/her upcoming vacation.

FIG. 1 illustrates an example computer 100 for transferring a web content display from one container to another container. The computer 100 may be any computing device, for example, a laptop computer, a desktop computer, a tablet computer, a mobile phone, a personal digital assistant (PDA), an electronic music player, a smart watch, a television coupled with one or more processors and a memory, etc.

As shown, the computer 100 includes a processing unit 105, a network interface 110, and a memory 115. The processing unit 105 includes one or more processors. The processing unit 105 may include a central processing unit (CPU), a graphics processing unit (GPU), or any other processing unit. The processing unit 105 executes computer instructions that are stored in a computer-readable medium, for example, the memory 115. The network interface 110 allows the computer 100 to transmit and receive data in a network, for example, the Internet, an intranet, a cellular network, a local area network, a wide area network, a wired network, a wireless network, a virtual private network (VPN), etc. The memory 115 stores data and/or instructions. The memory 115 may be one or more of a cache unit, a storage unit, an internal memory unit, or an external memory unit. As illustrated, the memory 115 includes an attach web content display module 120 and containers 125A and 125B. While two containers 125A and 125B are illustrated, the memory 115 may store any number of containers.

As shown, the container 125A includes a DOM tree 130A and a web content display 135A. The DOM tree 130A may be a tree structure for organizing nodes (e.g., objects or data points) within the container 125A. The web content display 135A may display information (e.g., text, image(s), video(s), etc.) processed by the container 125A. The web content display 135A may include displayed web content or displayed application content. While the container 125A is illustrated as including a single web content display 135A, the container 125A may include any number of web content displays, for example, a single web content display or multiple web content displays. As illustrated, the web content display 135A has a state 140A, which is represented by state components 145A.1-3. While the state 140A is illustrated as having three components 145A.1-3, a state may have any number of components. The state components 145A.1-3 may represent the state of the displayed web content or the displayed application content in the web content display 135A.

The container 125B includes a DOM tree 130B. The DOM tree 130B may be a tree structure for organizing nodes (e.g., objects or data points) within the container 125B. As shown, a web content display 135B is created within the container 125B. The web content display 135B has a state 140B that is represented by state components 145B.1-3. The web content display 135B corresponds to the web content display 135A transferred into the container 125B and adjusted according to the properties of the DOM tree 130B of the container 125B. For example, the DOM tree 130B may specify a size (e.g., 6 inches×3 inches), a transparency (e.g., translucent), and a set of available event listens (e.g., mouse click, mouse hover, keyboard tap, etc.). The web content display 135B may include frames (e.g., text, images, videos, etc.) similar to the web content display 135A. However, the web content display 135B may be adjusted according to the size, transparency, and available event listeners of the DOM tree 130B. For instance, macros within the web content display 135A that respond to event listeners within the set of available event listeners of the DOM tree 130B may be handled in the web content display 135B, while other macros of the web content display 135A may not be handled in the web content display 135B. The state components 145B.1-3 of the state 140B are either copied directly from the state components 145A.1-3 of the state 140A or adjusted according to the requirements of the new host container's 125B DOM tree 130B.

In some examples, the container 125A and the container 125B may implement a platform of a primary application (e.g., primary web browser). The container 125A and the container 125B may implement the same browser application of the primary web browser or different browser applications of the primary web browser. The container 125A may correspond to a first window, and the container 125B may correspond to a second window.

The attach web content display module 120 may include an exposed API for transferring the web content display 135A from the container 125A to the container 125B while maintaining the state 140A of the web content display 135A in the web content display 135B created in the container 125B in conjunction with the transfer. When executed, the attach web content display module 120 causes the processing unit 105 to create the web content display 135B and set the state 140B and its state components 145B.1-3 based on the properties of the DOM tree 130B and the state 140A and state components 145A.1-3 of the web content display 135A. The operation of the attach web content display module 120 is described in greater detail in conjunction with FIG. 2, below. In the example of the primary web browser and the secondary web browser (implemented as a browser application of the primary web browser), as discussed above, the attach web content display module 120 may correspond to an API exposed by the primary web browser. The exposed API allows the secondary web browser to transfer the first web content display from the first container to the second container while maintaining state.

Figure 2:
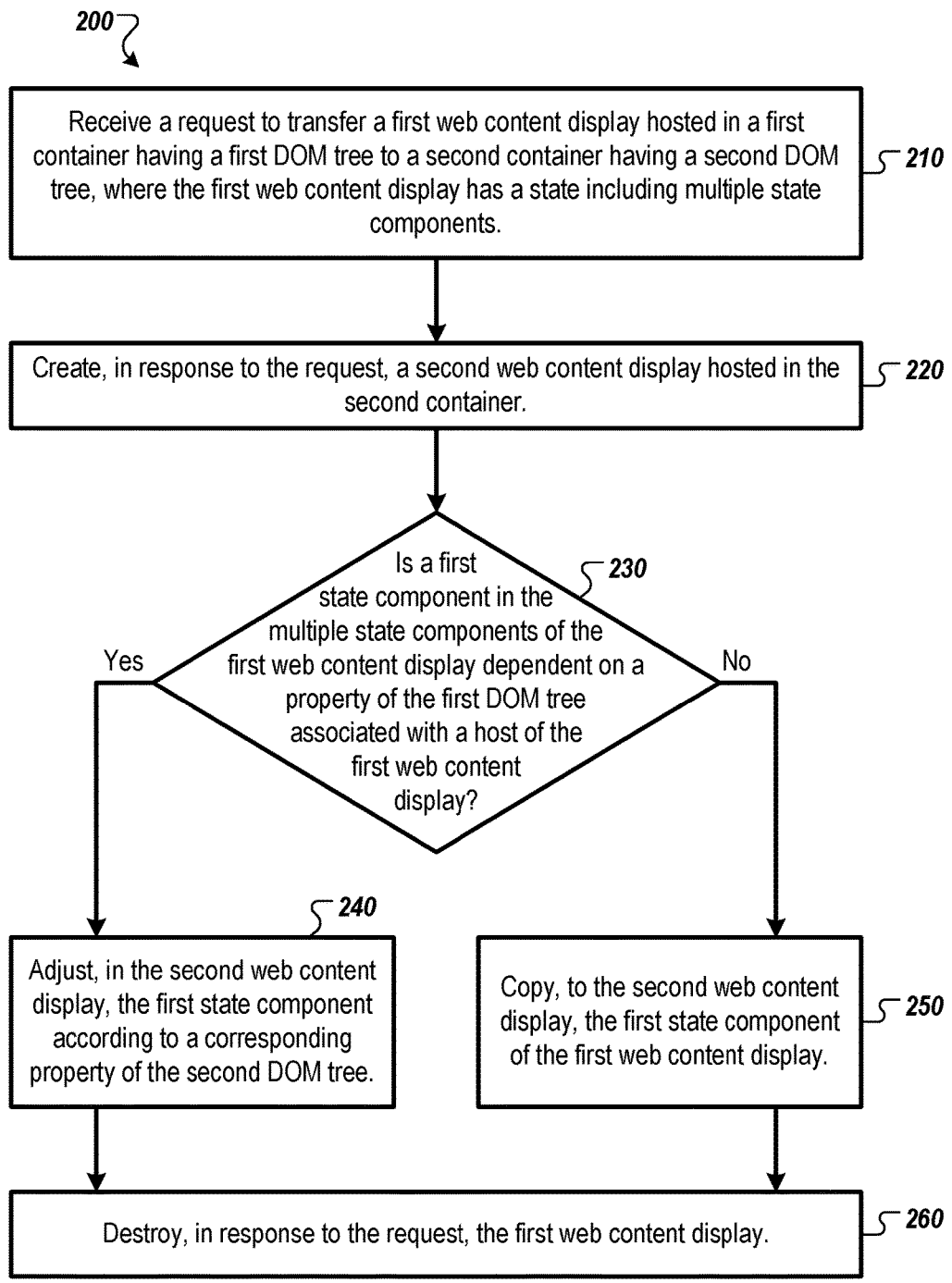
FIG. 2 illustrates an example process by which a web content display may be transferred from one container to another container.

FIG. 2 illustrates an example process 200 by which a web content display may be transferred from one container to another container.

The process 200 begins at step 210, where a computer (e.g., computer 100) receives a request to transfer a first web content display (e.g., web content display 135A) hosted in a first container (e.g., container 125A) having a first DOM tree (e.g., DOM tree 130A) to a second container (e.g., container 125B) having a second DOM tree (e.g., DOM tree 135B). The first web content display has a state (e.g., state 140) including multiple state components (e.g., state components 145B.1-3). For example, the first web content display may correspond to information displayed in a tab of an application implemented using a platform of a primary application (e.g., a web browser). The request may include using a mouse or a finger/stylus on a touchscreen to drag and drop the tab from a first window (corresponding to the first container) to a second window (corresponding to the second container).

In step 220, the computer creates, in response to the request, a second web content display (e.g., web content display 135B) hosted in the second container. The second web content display may be created using an API for transferring web content display(s) between containers (e.g., attach web content display module 120). In the above example, a tab for the second web content display may be created in the second window.

In step 230, the computer (e.g., while executing the attach web content display module 120) determines whether a first state component (e.g., state component 145A.1) in the multiple state components of the first web content display is dependent on a property of the first DOM tree associated with a host of the first web content display. The property may include a single property, a combination of multiple properties, a subset of a set of properties or the whole set of properties. The property of the first DOM tree may include, for example and among other things, the container having access to an event listener, a transparency of a web content display hosted by a container having the first DOM tree, or a size of a web content display hosted by a container having the first DOM tree. Some state components that may be dependent on the property of the first DOM tree include size (e.g., dependent on size of host container) and event listeners (e.g., dependent on event listeners present in the first DOM tree). Some state components that may be independent of the property of the first DOM tree include frames and uniform resource locators (URLs) of displayed information. According to some implementations, the computer stores a list (or another data structure) of state components that are dependent on the property of the first DOM tree and a list (or another data structure) of state components that are independent of the property of the first DOM tree. The computer determines whether the first state component is dependent on the property of the first DOM tree by comparing the first state component with the two lists. If the first state component does not appear on either list then, according to some examples, it is treated as dependent on the property of the first DOM tree. According to other examples, it is treated as independent of the property of the first DOM tree. The two lists may be stored at the computer and may occasionally be updated by a server transmitting a software update to the computer. If the state component is dependent on the property of the first DOM tree, the process 200 continues to step 240. If the state component is independent of the property of the first DOM tree, the process 200 continues to step 250.

In step 240, upon determining that the state component is dependent on the property of the first DOM tree, the computer (e.g., while executing the attach web content display module 120) adjusts, in the second web content display, the first state component (e.g., state component 145A.1) according to the corresponding property of the second DOM tree. As a result, the second container is able to host the transferred first web content display without having to implement functionality that is lacking in the second container. In other words, the second container will not require any new functionality to host the transferred version of the first web content display (i.e., the second web content display). The size specified by the second container, and the available event listeners of the second container might not need to be adjusted. Instead, the size of the first web content display may change after it is transferred, and the event handlers of the first web content display that depend on event listeners that are not available in the second web content display may be disabled. For example, if the second container specifies a size of four inches by four inches for web content displays within the second container, the second web content display may have a size of four inches by four inches, regardless of the size of the first web content display. If the second container lacks a "mouse click" event listener, any "mouse click" event listener(s) or event handler(s) in the first web content display may not be transferred to the second web content display. The web content display is notified that the state component is being changed, so that other components of the web content display may be changed accordingly. For example, if the size of the web content display is changed, the layout of text, image(s), etc., may be modified to fit the new size. After step 240, the process 200 continues to step 260.

In step 250, upon determining that the state component is independent of the property of the first DOM tree, the computer (e.g., while executing the attach web content display module 120) copies, to the second web content display, the first state component of the first web content display (e.g., state component 145A.1 is copied into state component 145B.1). For example, a URL accessed in the first web content display, and displayed text and images associated with the URL, or a frame displayed within the first web content display may be copied to the second web content display. As a result, state component(s) of the first web content display that are not dependent on the first container or the first DOM tree are copied directly from the first web content display to the second web content display, allowing the second web content display to appear and function similarly to the first web content display. After step 250, the process 200 continues to step 260.

In step 260, after having completed copying the state components (e.g., state components 145A.1-3) of the first web content display into the second web content display in the second container, the computer (e.g., while executing the attach web content display module 120) destroys, in response to the request to transfer the first web content display of step 210, the first web content display. The second web content display is now available for access in place of the first web content display. The computer may provide an output associated with the second web content display, for example, displaying the second web content display on the screen or otherwise indicating that the second web content display has been created in response to the request. After step 260, the process 200 ends.

As illustrated in FIG. 2, the steps 210-260 of the process 200 are implemented in series and according to an order. However, in some cases, the step 210-260 may be implemented in a different order, or two or more of the steps 210-260 may be implemented in parallel. For example, in some cases, the steps 230-250 may be implemented for each state component (e.g., each of the state components 145A.1-3) of the state of the first web content display before implementing step 260. Alternatively, the steps 230-250 may be implemented for only one of the state components or a portion of the state components.

Figure 3:
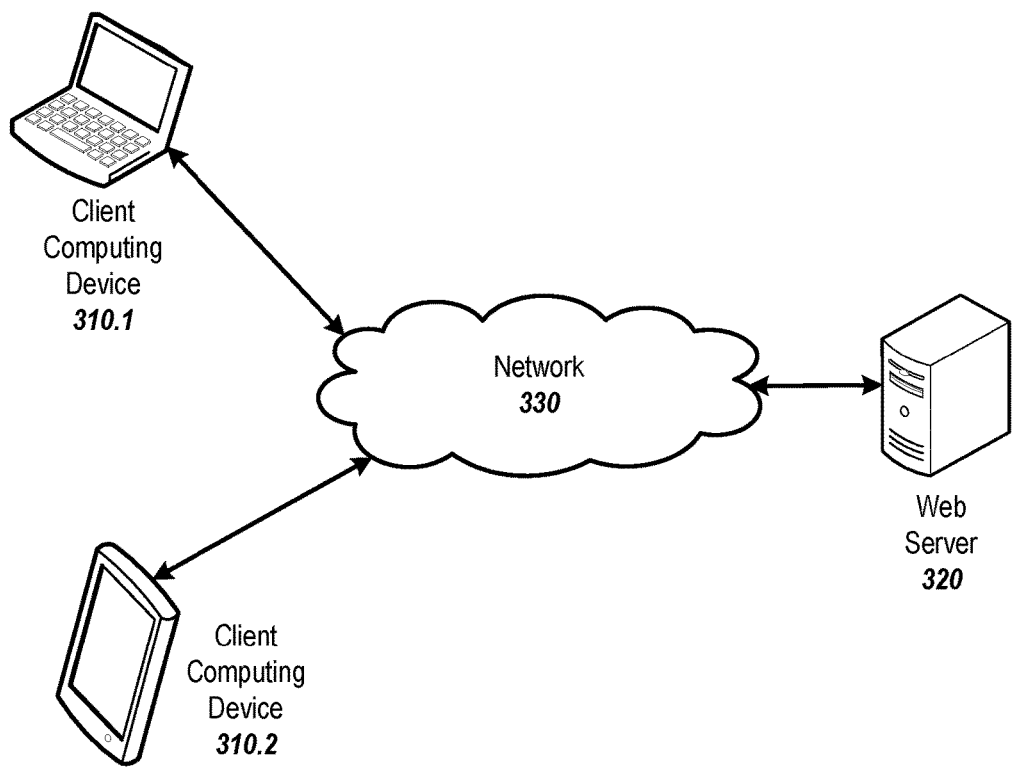
FIG. 3 illustrates an example network system for transferring a web content display from one container to another container.

FIG. 3 illustrates an example network system 300 for transferring a web content display from one container to another container. As shown, the system 300 includes client computing devices 310.1 and 310.2 connected to one another and to a web server 320 via a network 330. The network 330 may include any network(s), for example, the Internet, an intranet, a cellular network, a local area network, a wide area network, a wired network, a wireless network, a VPN, etc. Each client computing device 310.1-2 may be any computing device, for example, a laptop computer, a desktop computer, a tablet computer, a mobile phone, a personal digital assistant (PDA), an electronic music player, a smart watch, a television coupled with one or more processors and a memory, etc. One of the client computing devices 310.1 or 310.2 may correspond to the computer 100 of FIG. 1, and the computer 100 may use the network interface 110 to access the network 330. The web server 320 may be a server that stores web-based content accessible at the client computing device(s) 310.1-2 via the network 330.

While two client computing devices 310.1-2 are illustrated in FIG. 3, the subject technology may be implemented with any number of client computing devices. Similarly, while a single web server 320 is illustrated in FIG. 3, the subject technology may be implemented with any number of web servers.

According to some aspects of the subject technology, the information displayed within the web content display (e.g., web content display 135A or 135B) is loaded at the client computing device (e.g., client computing device 310.1 or 310.2) via the network 330 and from the web server 320. According to other aspects of the subject technology, the information displayed within the web content display is stored locally at the client computing device.

As described above, a web content display may be transferred from a first container to a second container, where both the first container and the second container reside at the same client computing device. However, in accordance with some alternative implementations, a web content display may be transferred from a first container at a first client computing device (e.g., client computing device 310.1) to a second container at a second client computing device (e.g., client computing device 310.2) using the process 200 described in conjunction with FIG. 2. The transfer may be completed over a network (e.g., network 330) and after the users of the two client computing devices have provided permissions for containers to be transferred between the two client computing devices over an interface (e.g., a web conferencing interface or a business collaboration interface).

Figure 4:
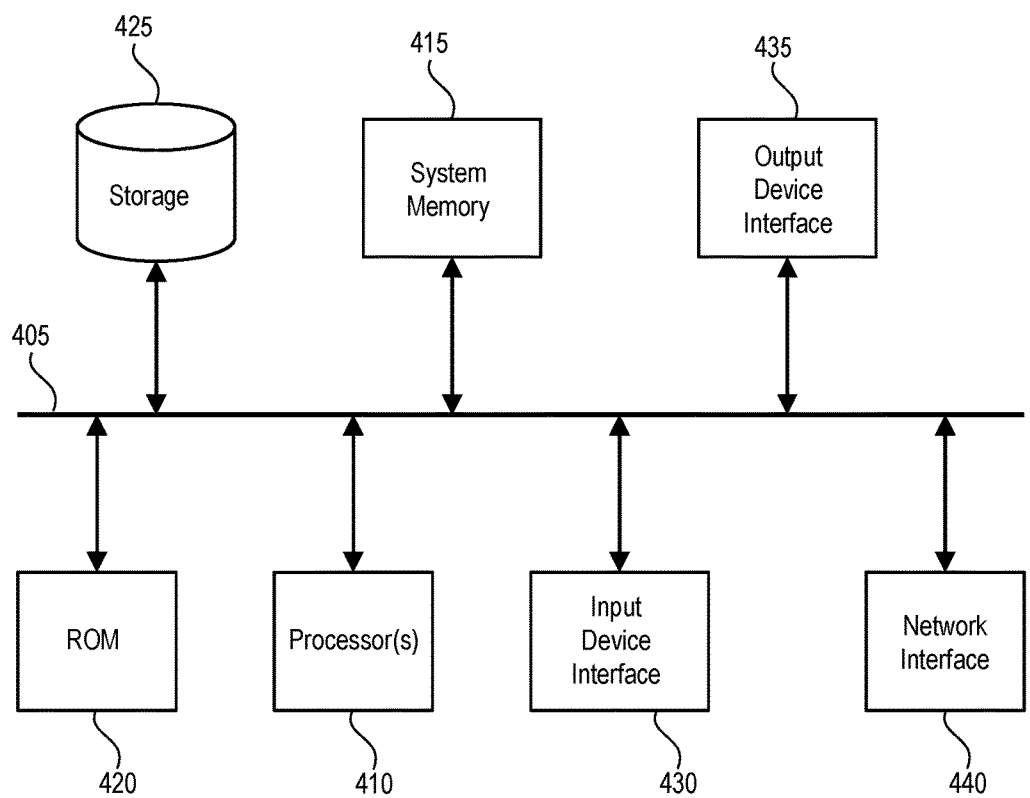
FIG. 4 conceptually illustrates an example electronic system with which some implementations of the subject technology are implemented.

FIG. 4 conceptually illustrates an electronic system 400 with which some implementations of the subject technology are implemented. For example, one or more of the computer 100, the client computing devices 310.1-2 or the web server 320 may be implemented using the arrangement of the electronic system 400. The electronic system 400 can be a computer (e.g., a mobile phone, PDA), or any other sort of electronic device. Such an electronic system includes various types of computer readable media and interfaces for various other types of computer readable media. Electronic system 400 includes a bus 405, processor(s) 410, a system memory 415, a read-only memory 420, a permanent storage device 425, an input device interface 430, an output device interface 435, and a network interface 440.

The bus 405 collectively represents all system, peripheral, and chipset buses that communicatively connect the numerous internal devices of the electronic system 400. For instance, the bus 405 communicatively connects the processor(s) 410 with the read-only memory 420, the system memory 415, and the permanent storage device 425.

From these various memory units, the processor(s) 410 retrieves instructions to execute and data to process in order to execute the processes of the subject technology. The processor(s) can include a single processor or a multi-core processor in different implementations.

The read-only-memory (ROM) 420 stores static data and instructions that are needed by the processor(s) 410 and other modules of the electronic system. The permanent storage device 425, on the other hand, is a read-and-write memory device. This device is a non-volatile memory unit that stores instructions and data even when the electronic system 400 is off. Some implementations of the subject technology use a mass-storage device (for example, a magnetic or optical disk and its corresponding disk drive) as the permanent storage device 425.

Other implementations use a removable storage device (for example a floppy disk, flash drive, and its corresponding disk drive) as the permanent storage device 425. Like the permanent storage device 425, the system memory 415 is a read-and-write memory device. However, unlike storage device 425, the system memory 415 is a volatile read-and-write memory, such a random access memory. The system memory 415 stores some of the instructions and data that the processor needs at runtime. In some implementations, the processes of the subject technology are stored in the system memory 415, the permanent storage device 425, or the read-only memory 420. For example, the various memory units include instructions for transferring a web content display from one container to another container while maintaining state in accordance with some implementations. From these various memory units, the processor(s) 410 retrieves instructions to execute and data to process in order to execute the processes of some implementations.

The bus 405 also connects to the input and output device interfaces 430 and 435. The input device interface 430 enables the user to communicate information and select commands to the electronic system. Input devices used with input device interface 430 include, for example, alphanumeric keyboards and pointing devices (also called "cursor control devices"). Output device interfaces 435 enables, for example, the display of images generated by the electronic system 400. Output devices used with output device interface 435 include, for example, printers and display devices, for example, cathode ray tubes (CRT) or liquid crystal displays (LCD). Some implementations include devices for example a touch screen that functions as both input and output devices.

Finally, as shown in FIG. 4, bus 405 also couples electronic system 400 to a network (not shown) through a network interface 440. In this manner, the electronic system 400 can be a part of a network of computers (for example a local area network (LAN), a wide area network (WAN), or an Intranet, or a network of networks, for example the Internet. Any or all components of electronic system 400 can be used in conjunction with the subject technology.

FIG. 5 illustrates example code for a swap function 500. As illustrated in FIG. 5, the swap function 500 takes two browser windows (named using variables a and b), and swaps the web content displays of these two browser windows. Thus, after executing the swap function 500, the web content display that was previously in browser window a is now in browser window b, and the web content display that was previously in browser window b is now in browser window a. In alternative implementations, the swap function 500 may be used with windows of any application, not necessarily browser windows. Also, the swap function 500 may be written using any code in any programming language, not necessarily the code presented in FIG. 5.

The above-described features and applications can be implemented as software processes that are specified as a set of instructions recorded on a computer readable storage medium (also referred to as computer readable medium). When these instructions are executed by one or more processor(s) (which may include, for example, one or more processors, cores of processors, or other processing units), they cause the processor(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processor and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A method for transferring web content display comprising:
   responsive to a request to transfer a first web content display from a first container having a first tree structure for organizing nodes to a second container having a second tree structure, creating a second web content display in the second container;
   determining whether a first state component of the first web content display is dependent on a property of the first tree structure associated with the first web content display,
      wherein if the first state component is dependent on the property of the first tree structure, adjusting the first state component according to a corresponding property of the second tree structure to create a corresponding state component in the second web content display, and
      wherein if the first state component is independent of the property of the first tree structure, copying the first state component of the first web content display to the second web content display; and
   outputting the second web content display.

2. The method of claim 1, further comprising:
   destroying the first web content display in the first container.

3. The method of claim 1, wherein the first web content display comprises displayed web content or displayed application content.

4. The method of claim 1, wherein the property comprises a single property, a combination of multiple properties, a subset of a set of properties, or a whole set of properties.

5. The method of claim 1, wherein the property of the first tree structure comprises having access to an event listener, a transparency of a web content display of a container having the tree structure, or a size of a web content display of a container having the tree structure.

6. The method of claim 1, wherein state components independent of the property of the first tree structure comprise frames and uniform resource locators (URLs) of displayed information.

7. The method of claim 1, wherein determining whether the first state component of the first web content display is dependent on the property of the first tree structure associated with the first web content display comprises comparing the first state component against one or more lists of state components.

8. The method of claim 1, wherein the first container and the second container implement the same platform of a browser.

9. The method of claim 1, wherein the first container and the second container implement different browser applications.

10. The method of claim 1, wherein the first container and the second container comprise different windows.

11. The method of claim 1, wherein outputting the second web content display comprises displaying the second web content display or displaying an indication that the second web content display has been created.

12. A non-transitory computer-readable medium comprising instructions which, when executed by a computer, cause the computer to implement a method for transferring web content display comprising:
    responsive to a request to transfer a first web content display from a first container having a first tree structure for organizing nodes to a second container having a second tree structure, creating a second web content display in the second container;

determining whether a first state component of the first web content display is dependent on a property of the first tree structure associated with the first web content display,
  wherein if the first state component is dependent on the property of the first tree structure, adjusting the first state component according to a corresponding property of the second tree structure to create a corresponding state component in the second web content display, and
  wherein if the first state component is independent of the property of the first tree structure, copying the first state component of the first web content display to the second web content display; and
destroying the first web content display,
wherein two or more of the creating, determining, adjusting, or copying implementations are performed in parallel.

13. The computer-readable medium of claim 12, the method further comprising:
  outputting the second web content display.

14. The computer-readable medium of claim 12, wherein the first web content display comprises displayed web content or displayed application content.

15. The computer-readable medium of claim 12, wherein the property comprises a single property, a combination of multiple properties, a subset of a set of properties, or a whole set of properties.

16. The computer-readable medium of claim 12, wherein the property of the first tree structure comprises having access to an event listener, a transparency of a web content display of a container having the tree structure, or a size of a web content display of a container having the tree structure.

17. The computer-readable medium of claim 12, wherein state components independent of the property of the first tree structure comprise frames and uniform resource locators (URLs) of displayed information.

18. The computer-readable medium of claim 12, wherein determining whether the first state component of the first web content display is dependent on the property of the first tree structure associated with the first web content display comprises comparing the first state component against one or more lists of state components.

19. The computer-readable medium of claim 12, wherein the first container and the second container implement the same or different browser applications or platforms.

20. A system comprising:
one or more processors; and
a memory comprising instructions which, when executed by the one or more processors, cause the one or more processors to implement a method for transferring web content display comprising:
responsive to a request at the one or more processors to transfer a first web content display from a first container to a second container, creating a second web content display in the second container; and
determining whether a first state component of the first web content display is dependent on a property of the first container,
  wherein if the first state component is dependent on the property of the first container, adjusting the first state component according to a corresponding property of the second container to create a corresponding state component in the second web content display, and
  wherein if the first state component is independent of the property of the first container, copying the first state component of the first web content display to the second web content display.

\* \* \* \* \*